(12) United States Patent
Kakishima

(10) Patent No.: US 12,058,294 B2
(45) Date of Patent: Aug. 6, 2024

(54) IMAGE FORMING APPARATUS THAT FORMS IMAGE FOR HALF-CUTTING, CONTROL METHOD THEREFOR, AND STORAGE MEDIUM

(71) Applicant: CANON KABUSHIKI KAISHA, Tokyo (JP)

(72) Inventor: Hiroyuki Kakishima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/485,568

(22) Filed: Oct. 12, 2023

(65) Prior Publication Data
US 2024/0137451 A1    Apr. 25, 2024

(30) Foreign Application Priority Data

Oct. 21, 2022   (JP) ................................. 2022-169288

(51) Int. Cl.
*H04N 1/21*   (2006.01)
*H04N 1/00*   (2006.01)

(52) U.S. Cl.
CPC ..... *H04N 1/00676* (2013.01); *H04N 1/00649* (2013.01)

(58) Field of Classification Search
None
See application file for complete search history.

(56) References Cited

U.S. PATENT DOCUMENTS

| | | | | |
|---|---|---|---|---|
| 2003/0156883 A1* | 8/2003 | Kobayashi | ............. | B41J 11/666 400/621 |
| 2008/0017617 A1* | 1/2008 | Watanabe | ............. | B31D 1/026 219/121.67 |
| 2009/0297247 A1* | 12/2009 | Yaguchi | ................. | B41J 11/666 400/621 |
| 2015/0145916 A1* | 5/2015 | Ando | ..................... | B41J 11/663 347/16 |
| 2018/0273230 A1* | 9/2018 | Hasegawa | ............. | B41J 11/663 |
| 2021/0303844 A1* | 9/2021 | Goda | ................. | G03G 15/6582 |

FOREIGN PATENT DOCUMENTS

JP    2019-151028 A    9/2019

* cited by examiner

*Primary Examiner* — Dung D Tran
(74) *Attorney, Agent, or Firm* — Venable LLP

(57) ABSTRACT

An image forming apparatus capable of leaving necessary images formed on seal paper, even when a removal operation is performed on an image forming paper, which includes the seal paper and release paper, after half-cutting processing. The image forming apparatus has an image forming part for forming a first image and a second image indicating additional information related to the first image, on the seal paper. The image forming apparatus makes setting related to the additional information, acquires information related to first half-cutting for leaving a portion of the first image in the seal paper on the release paper after the half-cutting processing and information related to second half-cutting for leaving, based on the setting, a portion of the second image in the seal paper on the release paper after the half-cutting, and forms the first and second images on the seal paper.

12 Claims, 14 Drawing Sheets

IMAGE FORMING APPARATUS THAT FORMS IMAGE FOR HALF-CUTTING, CONTROL METHOD THEREFOR, AND STORAGE MEDIUM

BACKGROUND OF THE INVENTION

Field of the Invention

The present invention relates to an image forming apparatus that forms an image for half-cutting, a control method therefor, and a storage medium.

Description of the Related Art

Conventionally, regarding a technique of label printing on roll paper, there is a technique of adding, to a margin area excluding a label, additional information such as information on label manufacturing (for example, a manufacturer, a manufacturing date, and the like), information on a delivery form of roll paper, and the like. Then, by allowing a user to confirm this additional information, for example, it is possible to reduce an error in management work and to improve work efficiency. As a technique of adding additional information, for example, there is known an image forming apparatus described in Japanese Laid-Open Patent Publication (kokai) No. 2019-151028. The image forming apparatus performs setting related to the additional information, and adds the additional information based on the setting to roll paper. Generally, when the roll paper formed of seal paper and release paper is used, a label is printed on the seal paper, and then a post-process is performed. In the post-process, half-cut is performed on the periphery of the label and a removal operation is performed so as to remove a margin portion excluding the label. In the case of using a label generated by a method in which such a post-process is introduced, it is easy to attach the label to a commodity or the like using an automatic labeling machine.

However, in a case where additional information is described in the margin portion, there is a problem in that the additional information is removed along with margin portion when the removal operation is performed, and even if a user desires to confirm the additional information thereafter, the user cannot confirm the additional information.

SUMMARY OF THE INVENTION

The present invention provides an image forming apparatus capable of leaving a first image and a second image formed on seal paper as they are on release paper even when "a removal operation" of removing a margin portion of the seal paper is performed on an image forming paper, a control method therefor, and a storage medium.

Accordingly, the present invention provides an image forming apparatus that is configured to form an image related to half-cutting processing, in which only a periphery of the image on seal paper of image forming paper is cut without cutting release paper, the image forming paper including the seal paper having an adhesive surface and release paper capable of being peeled off from the adhesive surface, the image forming apparatus comprising an image forming part configured to form a first image and a second image indicating additional information related to the first image, on the seal paper of the image forming paper, one or more controllers configured to function as a setting unit configured to make setting related to the additional information, an acquisition unit configured to acquire first half-cutting information related to first half-cutting for leaving a portion of the first image in the seal paper on the release paper after the half-cutting processing is performed, and to acquire, second half-cutting information related to second half-cutting for leaving, based on the setting made, a portion of the second image in the seal paper on the release paper after the half-cutting processing is performed, and a control unit configured to control the image forming part to form, on the seal paper, the first image and the second image based on the setting.

According to the present invention, even when image forming paper is subjected to a removal operation of removing a margin portion of seal paper, a second image can be left on release paper as it is together with a first image formed on the seal paper.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. However, the configurations described in the following embodiments are merely examples, and the scope of the present invention is not limited by the configurations described in the respective embodiments. For example, each part constituting the present invention can be replaced with a part having any configuration capable of implementing a similar function. In addition, any component may be added. Any two or more configurations (features) of the respective embodiments can be combined.

Figure 1:
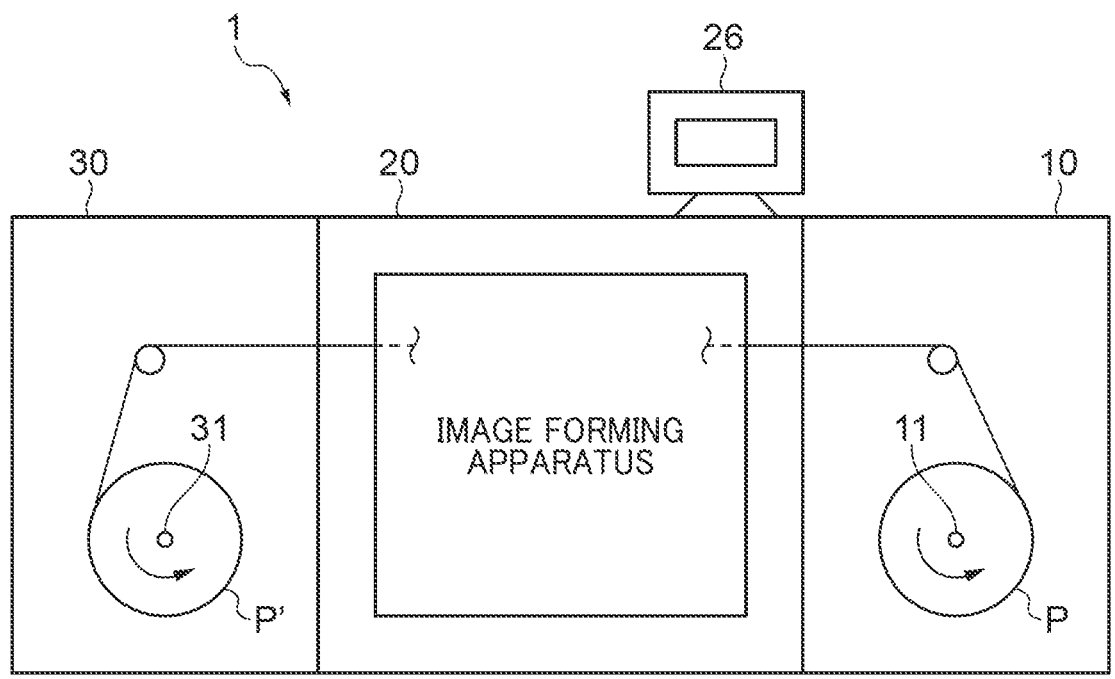
FIG. 1 is a diagram showing an example of a schematic configuration of an image forming system according to a first embodiment.

A first embodiment will be described with reference to FIGS. 1 to 7. FIG. 1 is a diagram showing an example of a schematic configuration of an image forming system 1 according to the first embodiment. The image forming system 1 shown in FIG. 1 is a system that forms an image on roll paper (continuous paper) P as image forming paper. The image forming system 1 includes a paper feeding apparatus 10, an image forming apparatus 20, and a winding apparatus 30 which are sequentially arranged in this order from the upstream side to the downstream side in the conveyance direction of the roll paper P. The paper feeding apparatus 10 and the image forming apparatus 20 are connected to each other, and the image forming apparatus 20 and the winding apparatus 30 are connected to each other. The roll paper P is wound around a paper tube in a roll shape. The roll paper P includes seal paper 601 having an adhesive surface, and release paper 701 that can be peeled off from the adhesive surface (refer to FIGS. 6 and 7).

The paper feeding apparatus 10 is an apparatus that supplies the roll paper P to the image forming apparatus 20. In the present embodiment, the paper feeding apparatus 10 includes a rotatable rotation shaft 11 disposed in parallel with the horizontal direction. The rotation shaft 11 supports the paper tube of the roll paper P and rotates together with the paper tube. Then, the roll paper P is conveyed toward the image forming apparatus 20 at a constant speed while being stretched via a plurality of rollers such as a conveyance roller(s) and a paper feeding roller(s).

The image forming apparatus 20 forms an image on the roll paper P supplied from the paper feeding apparatus 10. Further, the image forming apparatus 20 conveys the roll paper P having the image formed thereon toward the winding apparatus 30. The winding apparatus 30 is an apparatus that winds the roll paper P conveyed from the image forming apparatus 20 into a roll shape. In the present embodiment, the winding apparatus 30 includes a rotatable rotation shaft 31 disposed parallel with the horizontal direction. The rotation shaft 11 supports the paper tube used to wind the roll paper P and rotates together with the paper tube. The roll paper P supplied from the image forming apparatus 20 passes through a plurality of rollers such as a conveyance roller(s) and a paper discharging roller(s), and thereafter the roll paper P is wound in a roll shape at a constant speed around the paper tube supported by the rotation shaft 31. As a result, a product P' obtained by forming an image on the roll paper P is held by the paper tube supported by the rotation shaft 31.

Figure 2:
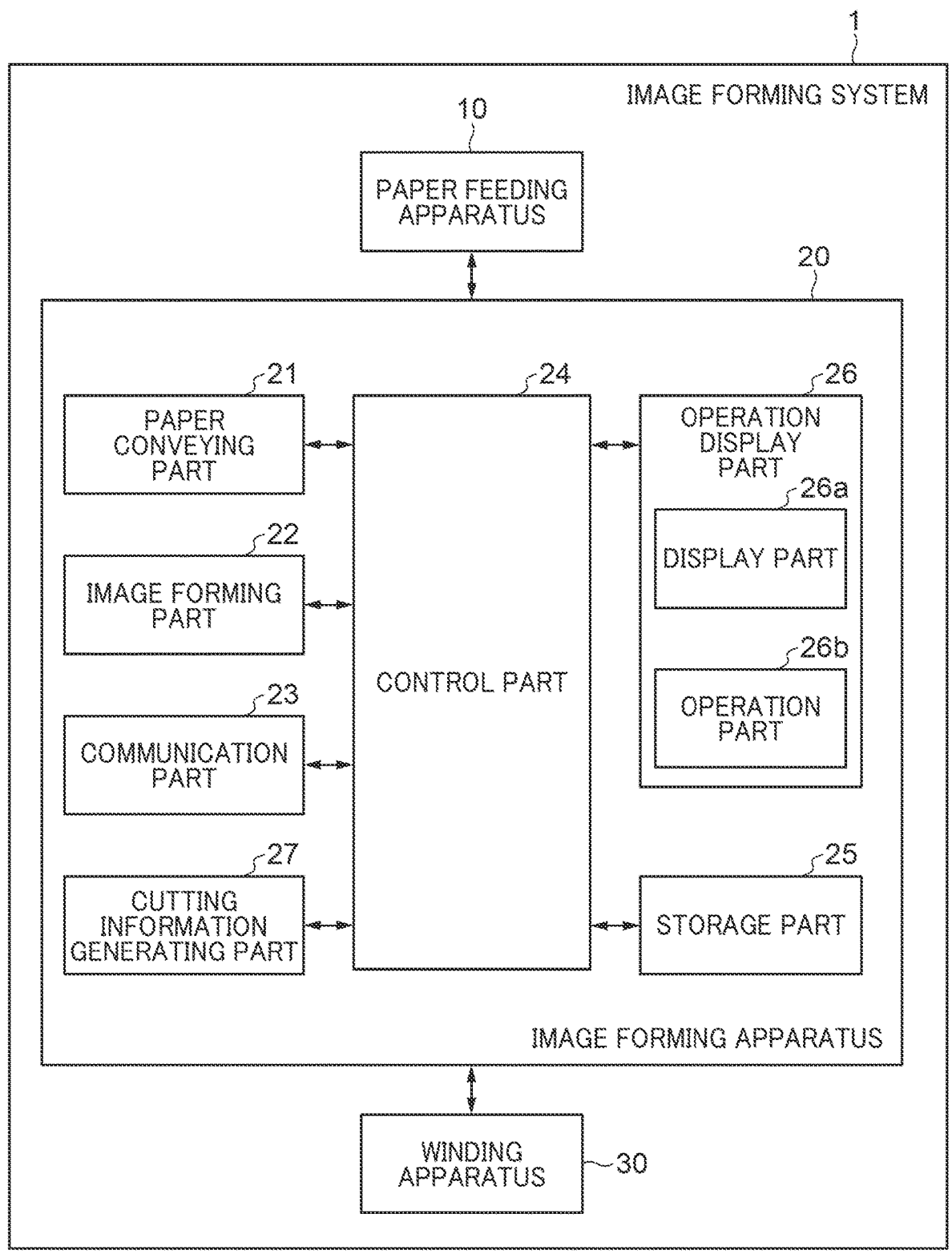
FIG. 2 is a block diagram showing a hardware configuration of the image forming system shown in FIG. 1.

FIG. 2 is a block diagram showing a hardware configuration of the image forming system 1 shown in FIG. 1. In the present embodiment, the paper feeding apparatus 10 and the winding apparatus 30 are external apparatuses of the image forming apparatus 20. As shown in FIG. 2, the image forming apparatus 20 includes a paper conveying part 21, an image forming part 22, a communication part 23, a control part (a control unit) 24, a storage part 25, an operation display part 26, and a cutting information generating part 27.

The paper conveying part 21 is a conveyance mechanism built in the image forming apparatus 20 and configured to convey the roll paper P. The paper conveying part 21 includes a plurality of rollers. These rollers rotate in the paper conveying part 21, and whereby the roll paper P conveyed from the paper feeding apparatus 10 can be conveyed to the image forming part 22, and the roll paper P having passed through the image forming part 22 can be conveyed to the winding apparatus 30. The image forming part 22 executes an image forming job (hereinafter, may be simply referred to as a "job") to form an image based on image data on the seal paper 601 of the roll paper P supplied from the paper feeding apparatus 10.

The image to be formed includes a first image and a second image. The "first image" is, for example, an image indicating a "recommended product", a "price label", or the like to be attached as a sticker (a label) to a commodity of a supermarket. In the example shown in FIG. 6, a job image 602 corresponds to the first image. The "second image" is an image indicating information (additional information) related to the first image. The second image can be, for example, an image indicating the name of the first image (delivery form information), the date and time when the first image should be attached as a sticker, and the like. In the example shown in FIG. 6, an additional image 603a and an additional image 603b correspond to the second image. It should be noted that each of the first image and the second image can be an image including a picture, a character, a symbol, or the like singly or in combination thereof.

The communication part 23 includes, for example, a communication control card such as a local area network (LAN) card. The communication part 23 transmits and receives various types of data to and from an external apparatus such as a personal computer (PC) or a half-cutting apparatus (post-processing machine) connected to a communication network such as a LAN or a wide area network (WAN).

The control part 24 includes, for example, a central processing unit (CPU), a random access memory (RAM), and the like. The CPU of the control part 24 reads various programs stored in the storage part 25, loads the programs in the RAM, and executes various types of processing according to the loaded programs. Examples of the various programs include a system program and a program for causing the CPU (computer) to execute each means (unit) of the image forming apparatus 20 (a control method for the image forming apparatus). The storage part 25 includes, for example, a nonvolatile semiconductor memory (a so-called flash memory), a hard disk drive (HDD), or the like. In addition to the above-described various programs, the storage part 25 also stores various types of data and the like necessary for execution of each program.

The operation display part 26 includes, for example, a liquid crystal display (LCD) with a touch panel, and has a function as a display part 26a and a function as an operation part 26b. The display part 26a displays various types of information based on a display control signal input from the control part 24. The operation part 26b includes various operation keys such as a numeric keypad, receives various types of input operations by a user, and outputs an operation signal corresponding to the input operation to the control part 24. The operation display part 26 also functions as a setting means (unit) (a setting process) configured to perform, for example, when a job is executed, setting related to additional information to be described later, that is, to perform a setting operation based on the additional information. The cutting information generating part 27 functions as a generation means (unit) configured to generate second half-cutting information to be described later based on the setting operation received on the operation display part 26.

Next, image forming processing of forming an image on the roll paper P will be described. The image forming processing is performed in the image forming apparatus 20. First, a user generates job data with, for example, a PC, which is an external apparatus, and performs print setting and delivery winding number setting for the job. The PC transmits the job data and a job ticket including information such as print setting and delivery winding number setting to the image forming apparatus 20 via the communication network. The control part 24 of the image forming apparatus 20 receives, via the communication part 23, the job data and the job ticket including the information such as the print setting and the delivery winding number setting transmitted from the PC. Thereafter, the control part 24 displays a job list 300 shown in FIG. 3 on the operation display part 26.

Figure 3:
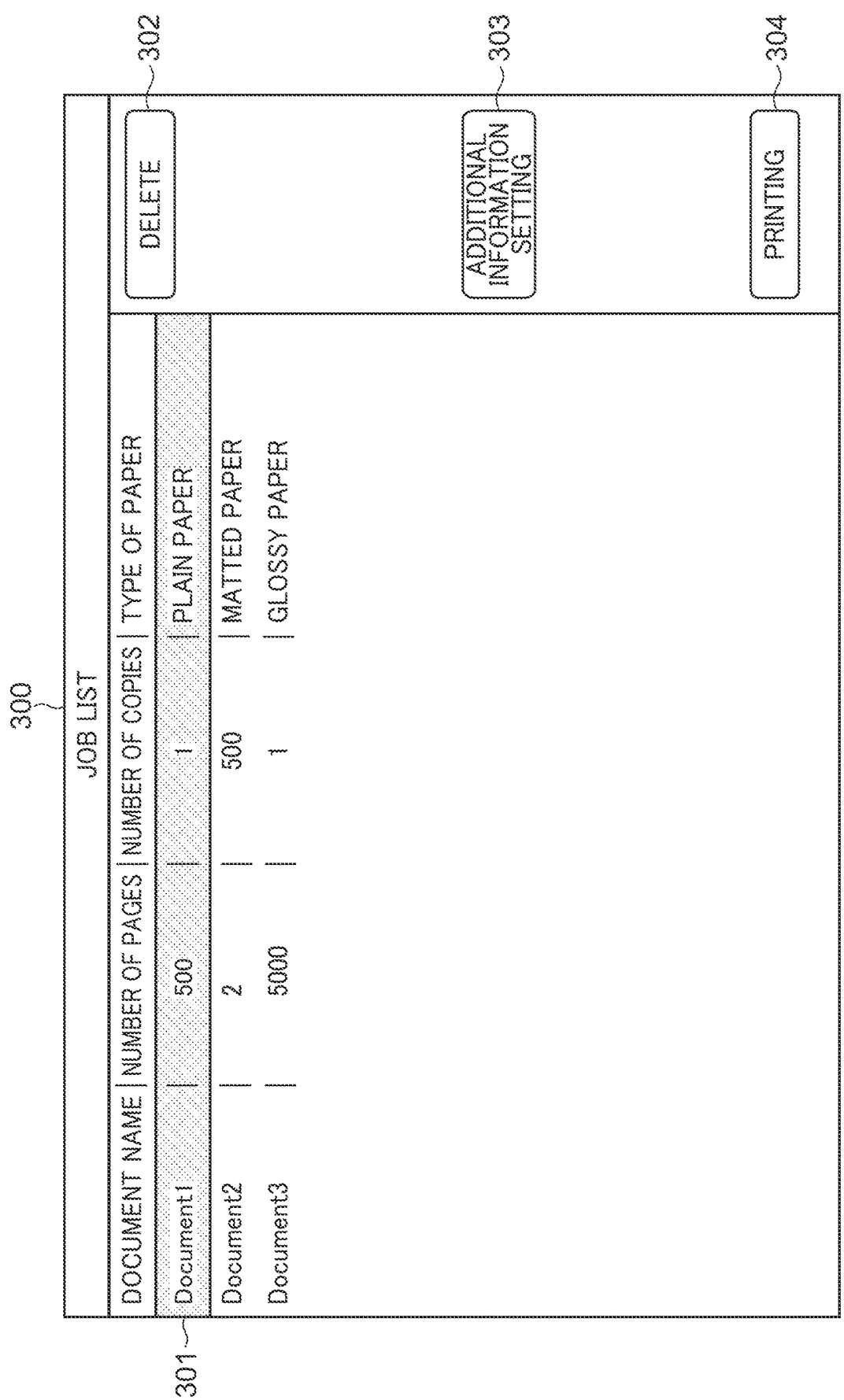
FIG. 3 is a diagram showing an example of a job list (a print setting screen) displayed on an operation display part of an image forming apparatus.

FIG. 3 is a diagram showing an example of a job list (a print setting screen) displayed on the operation display part of the image forming apparatus 20. As shown in FIG. 3, the job list 300 includes display items 301 to 304. The display item 301 is a display area that displays a list of jobs has been submitted (input) to the image forming apparatus 204. In the display item 301, a list of jobs is displayed in order of submitted. Job information included in this job includes a document name, the number of pages, the number of copies, a paper type, and the like. A user can select a job included in the list in the display item 301 by operating an operation key of the operation part 26*b*.

Figure 4:
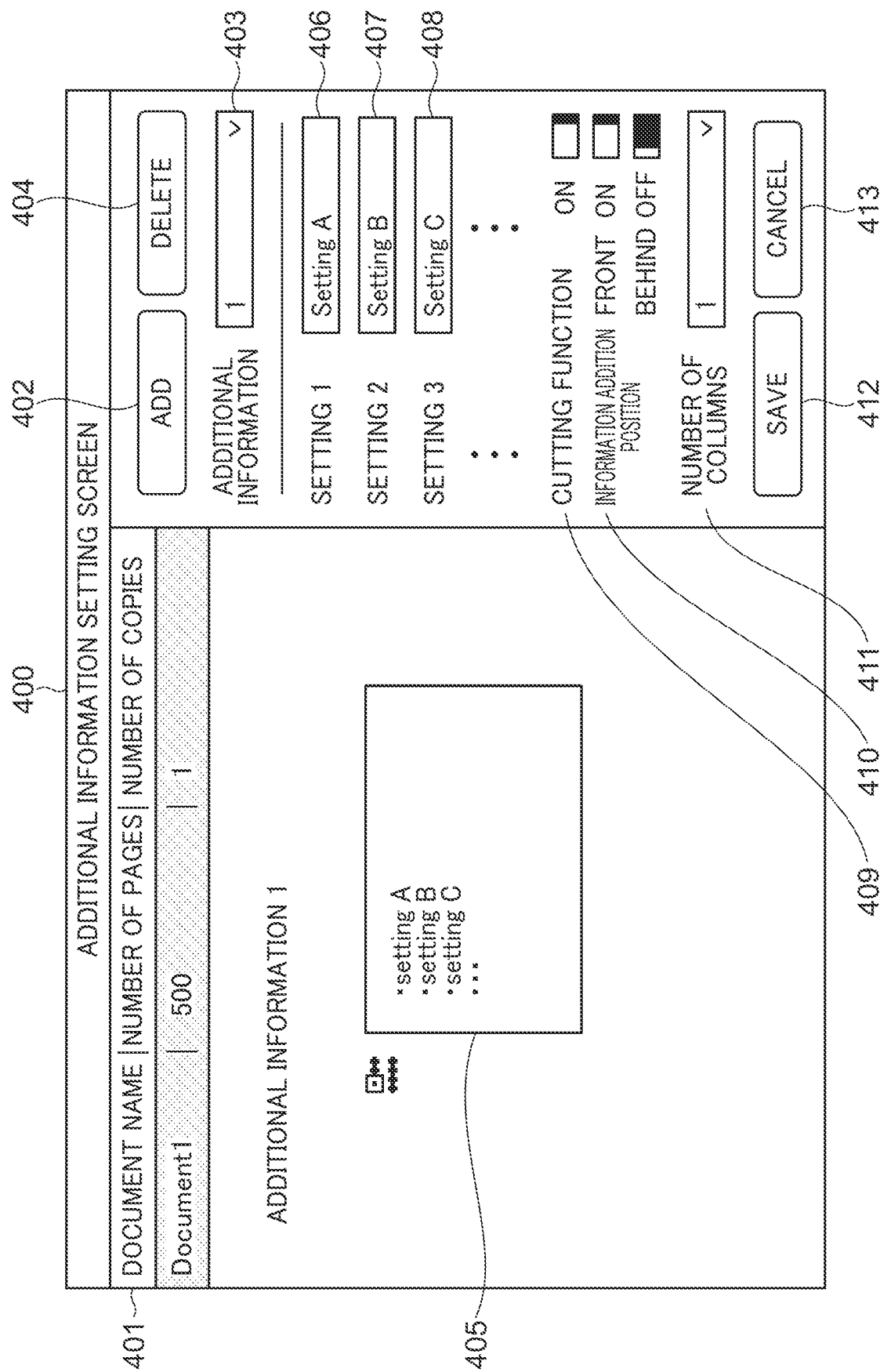
FIG. 4 is a diagram showing an example of an additional information setting screen.

Further, the job information is stored in the storage part 25. The display item 302 is a button for deleting, from the storage part 25, the job information and the like stored in the storage part 25, when operated (pressed). The display item 303 is a button for performing setting related to additional information. When the display item 303 is operated (pressed), an additional information setting screen 400 shown in FIG. 4 is displayed on the operation display part 26. On the additional information setting screen 400, setting related to additional information of a job selected in the display item 301 can be made. The display item 304 is a button for starting image formation (printing) based on the job selected in the display item 301 when operated (pressed). As a result, image formation based on the additional information is performed.

FIG. 4 is a diagram showing an example of the additional information setting screen 400. The additional information setting screen 400 is displayed on the operation display part 26 of the image forming apparatus 20 when the display item 303 in the job list 300 shown in FIG. 3 is pressed. The additional information setting screen 400 includes display items 401 to 413. The display item 401 is a display area for displaying job information related to the job selected in the display item 301 of the job list 300. The display item 402 is a button for adding one page of additional information when operated (pressed). That is, a unit of one addition of the additional information by operation of the display item 402 is expressed by "page" (an "additional information page"). It should be noted that the additional information for one page is printed as at least one second image (in the present embodiment, as one second image).

By operating the display item 403, one additional information page to be set can be selected from one or more additional information pages including the additional information page added by the operation of the display item 402. For example, one additional information page can be selected from a plurality of additional information pages by a pull-down operation of the display item 403. The display item 404 is a button for deleting the additional information page selected by the display item 403, when being operated (pressed). In the display item 405, a preview of the additional information page (the additional information) selected by the display item 403 is displayed. As a result, a user can confirm the additional information page (the second image).

Contents of the additional information included in the additional information page displayed on the preview in the display item 405 are individually designated (set) in the display item 406, the display item 407, and the display item 408. The contents of the additional information to be set may be, for example, job information such as a document name or the number of pages, and/or may be any character string indicating delivery form information of the product P' or the name of the product P'.

The display item 409 is an item for selecting ON/OFF of a cutting function. A user can select ON/OFF of the cutting function by operating the display item 409, that is, the user can select (set) whether or not to execute half-cutting using a half-cutting apparatus (not shown) (execution/non-execution of half-cutting). When the cutting function is turned ON, a half-cutting function is enabled. Here, the "half-cutting" (half-cutting processing) refers to processing of cutting, by using the half-cutting apparatus, only the periphery of an image on the seal paper 601 out of the seal paper 601 and the release paper 701 forming the roll paper P without cutting the release paper 701. An image portion and a remaining surplus portion (a margin portion) are divided by performing the half-cutting, in the seal paper 601. After the first image and the second image are formed, the roll paper P is conveyed to the half-cutting apparatus as the product P'.

The half-cutting apparatus can perform first half-cutting and second half-cutting. The "first half-cutting" is processing of leaving a portion of the first image on the seal paper 601 on the release paper 701, after the above-mentioned half-cutting is performed. The first half-cutting is performed regardless of the selection in the display item 409 (that is, regardless of selection of "ON/OFF of the cutting function", that is, "execution/non-execution of the half-cutting"). The "second half-cutting" is processing of leaving a portion of the second image on the seal paper 601 on the release paper 701, after the above-mentioned half-cutting is performed. The second half-cutting is performed in a case where ON of the cutting function is selected in the display item 409.

Examples of the half-cutting apparatus include an apparatus that performs half-cutting using laser light, an apparatus that performs half-cutting using die cutting, and the like. The apparatus that performs half-cutting using laser light can freely change a half-cutting shape surrounding an image. The apparatus that performs half-cutting using die cutting is effective in a case where a half-cutting shape surrounding an image is fixed. Then, in the product P' obtained by performing the first half-cutting and/or the second half-cutting on the roll paper P, a remaining surplus portion other than the first image and/or the second image in the seal paper 601 is removed, that is, processing called a "removal operation" is performed.

The display item 410 is an item for setting the position of the second image (the additional information) on the roll paper P. In the example shown in FIG. 4, with respect to the first image (the job image), it is selectable any one of the arrangement of the second image on a part in front of the first image (hereinafter, also simply referred to as "in front of") in the conveyance direction of the roll paper P (hereinafter, also simply referred to as "conveyance direction"), the arrangement of the second image on a part behind the first image (hereinafter, also simply referred to as "behind") in the conveyance direction, and the arrangement of the second images on both in front of and behind the first image in the conveyance direction. The display item 411 is an item for setting the number of columns in the width direction of the roll paper P, each of the columns including pieces of additional information arranged. The display item 412 is a button for storing the contents set on the additional information setting screen 400 in the storage part 25 when being operated (pressed). The display item 413 is a button for canceling the contents set on the additional information setting screen 400 when being operated (pressed).

Figure 5:
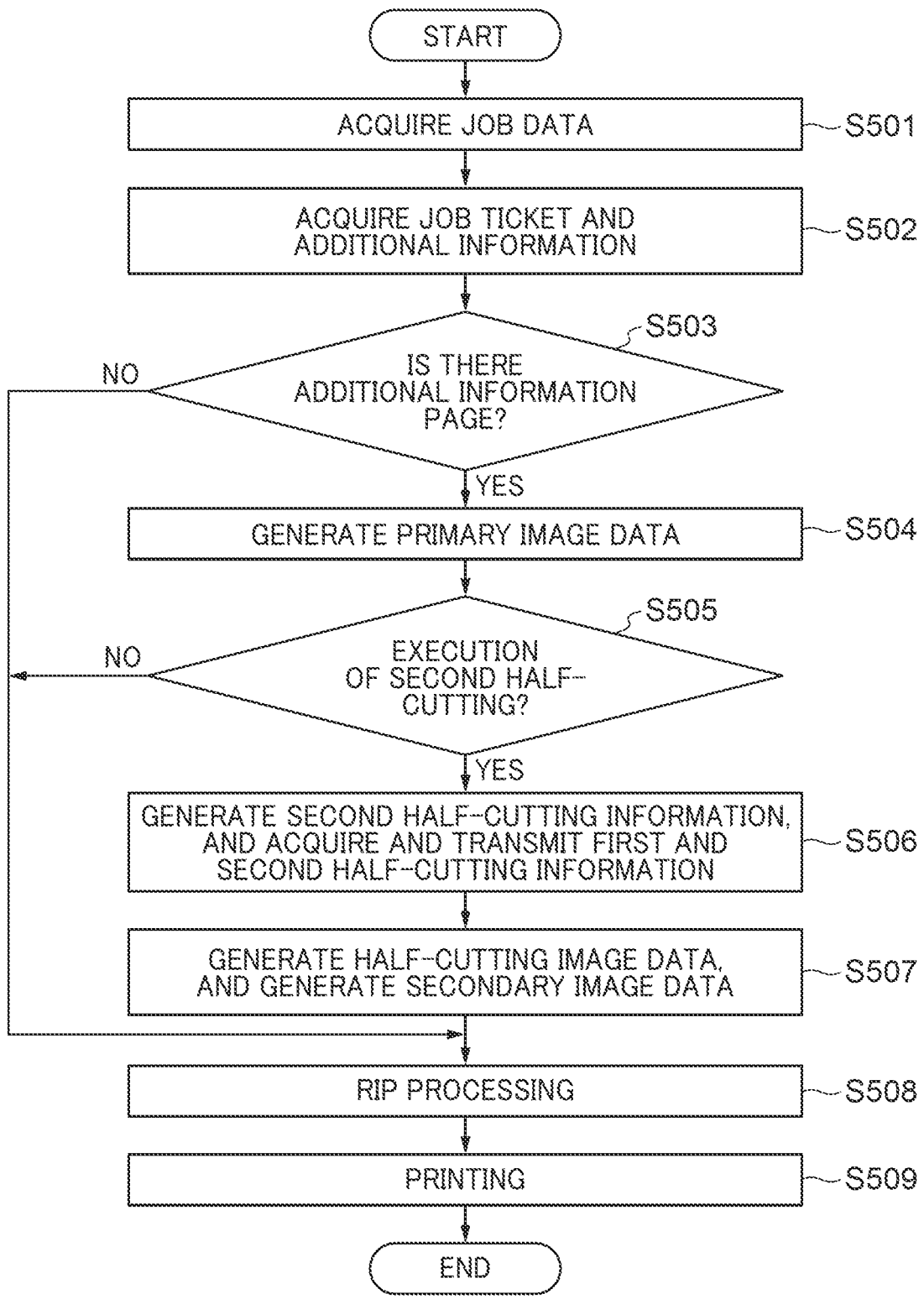
FIG. 5 is a flowchart showing an example of image forming processing.

FIG. 5 is a flowchart showing an example of image forming processing. The image forming processing is executed by the control part 24 when printing is performed on the roll paper P. Namely, the image forming processing is a program stored in the storage part 25 and executed by the CPU of the control part 24, and is started when a user selects one job in the display item 301 of the job list 300 and presses the display item 304.

First, in step S501, the control part 24 acquires data of a job (job data) selected in the display item 301. In step S502, the control part 24 acquires a job ticket of the job selected in the display item 301 and additional information set by a user on the additional information setting screen 400.

In step S503, the control part 24 determines whether to add a second image (an image of an additional information page) to a first image (a job) (a delivery information image), based on information indicating whether or not there is the additional information (the additional information page) in the information acquired in step S502. In a case where it is determined in step S503 that there is the additional information, that is, in a case where it is determined to add the second image, the processing proceeds to step S504. In a case where it is determined in step S503 that there is no additional information, that is, in a case where it is determined not to add the second image, the processing proceeds to step S508.

In step S504, the control part 24 generates image data (primary image data) including the first image and the second image, based on the additional information acquired in step S502. The second image is to be arranged in front of the first image in the conveyance direction, to be arranged behind the first image in the conveyance direction, or to be arranged both in front of and behind the first image in the conveyance direction, according to selection (setting) on the display item 410 on the additional information setting screen 400.

In step S505, the control part 24 determines whether to execute or not execute second half-cutting based on the information of ON/OFF of a cutting function in the additional information acquired in step S502. In a case where it is determined in step S505 that the second half-cutting is to be executed, the processing proceeds to step S506. In a case where it is determined in step S505 that the second half-cutting is not to be executed, the processing proceeds to step S508.

In step S506, the control part 24 controls the cutting information generating part 27 to generate second half-cutting information related to the second half-cutting. Then, the control part 24 acquires first half-cutting information related to first half-cutting, and acquires the second half-cutting information related to the second half-cutting from the cutting information generating part 27 (an acquisition process). The first half-cutting information is information indicating what shape should surround the first image in half-cutting. The second half-cutting information is information indicating what shape should surround the second image in the half-cutting.

The first half-cutting information is included in the job information in advance, for example, and is acquired from an external apparatus such as a PC. Further, the second half-cutting information is not limited to one acquired from the cutting information generating part 27, and may be acquired from an external apparatus such as a PC. As described above, in the present embodiment, the control part 24 also functions as an acquisition means (unit) configured to acquire the first half-cutting information and the second half-cutting information. Further in step S506, the control part 24 transmits the first half-cutting information and the second half-cutting information to the half-cutting apparatus via the communication part (a transmission means (unit)) 23.

In step S507, the control part 24 generates half-cutting image data including a first half-cutting image indicating the first half-cutting information and a second half-cutting image indicating the second half-cutting information. Then, the control part 24 generates secondary image data obtained by adding the half-cutting image data to the image data (the primary image data) generated in step S504. The first half-cutting image and the second half-cutting image are not particularly limited. For example, in a case where the half-cutting apparatus to be used is configured to be able to read an image, each half-cutting image indicating each half-cutting information can be an identification code such as a QR code (registered trademark).

In step S508, the control part 24 performs raster image processor (RIP) processing on the secondary image data generated in step S507 to generate image data (image data for printing) of an image to be printed on the roll paper P.

In step S509, the control part 24 controls the image forming part 22 to print the image data generated in step S508 on the roll paper P, and ends the processing (a control process). As a result, the roll paper P becomes the product P' on which the first image, the second image, the first half-cutting image, and the second half-cutting image are formed.

As described above, in a case where it is determined (selected) in step S505 that the second half-cutting is not executed, the processing proceeds to step S508. In this case, the formation of the second half-cutting image is omitted. This omission is effective in a case where the second image may be removed together with the surplus portion at the time of the removal operation.

Figure 6:
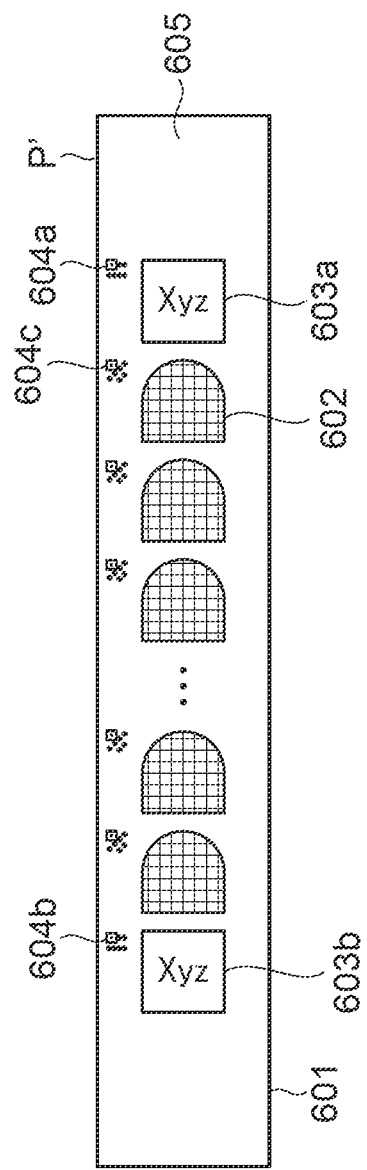
FIG. 6 is a plan view showing an example of a product obtained by the image forming system according to the first embodiment.

FIG. 6 is a plan view showing an example of the product P' obtained by the image forming system according to the first embodiment. As shown FIG. 6, on the seal paper 601, a plurality of job images 602 as a plurality of first images are arranged in a row in the longitudinal direction (the conveyance direction) of the seal paper 601. In the seal paper 601, an additional image 603a as a second image is arranged in front of the plurality of job images 602 in the conveyance direction, and an additional image 603b as a second image is arranged behind the plurality of job images 602 in the conveyance direction. The additional image 603a and the additional image 603b are the same image in the configuration shown in FIG. 6, but are not limited thereto, and may be different from each other.

On the seal paper 601, a QR code 604c as a first half-cutting image is arranged adjacently to each job image 602. Further, on the seal paper 601, a QR code 604a as a second half-cutting image is arranged adjacently to the additional image 603a, and a QR code 604b as a second half-cutting image is arranged adjacently to the additional image 603b. The QR codes 604a to 604c are arranged in a surplus portion (a margin portion) 605 of the seal paper 601. The QR code 604a and the QR code 604b are the same QR code in a case where the additional image 603a and the additional image 603b are the same image, and are different QR codes in a case where the additional image 603a and the additional image 603b are different images.

Figure 7:
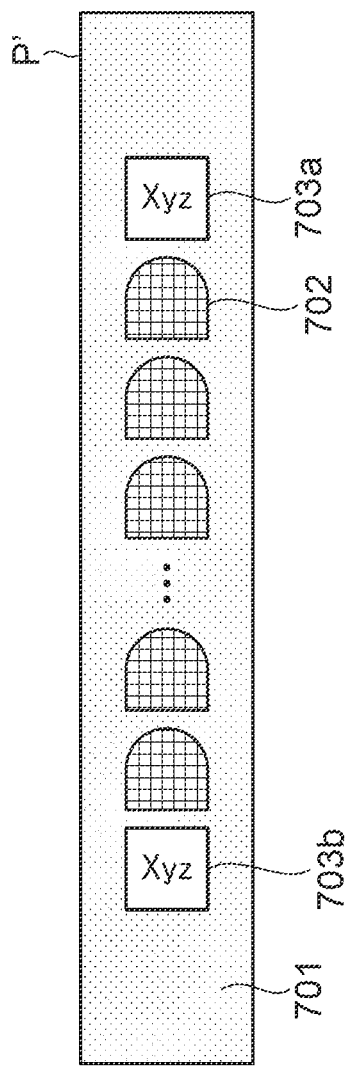
FIG. 7 is a plan view showing a state after the product shown in FIG. 6 is processed by a half-cutting apparatus.

FIG. 7 is a plan view showing a state after the product P' shown in FIG. 6 is processed by the half-cutting apparatus. The product P' shown in FIG. 7 is obtained by the product P' in FIG. 6 being subjected to a removal operation after the half-cutting. It should be noted that the half-cutting by the half-cutting apparatus is performed based on the QR codes 604a to 604c. On the release paper 701 of the product P' obtained by being subjected to the removal operation, job images 702 which are small pieces of the job images 602 formed by the removal operation, additional information 703a which is a small piece of the additional image 603a formed by the removal operation, and additional information 703b which is a small piece of the additional image 603b formed by the removal operation, remain.

As described above, even after the removal operation, in the product P', the additional image 603a and the additional image 603b remain on the release paper 701 as they are, together with the job image 602 formed on the seal paper 601. As a result, it is possible for a user to manage, for example, the name (delivery form information) of the job image 702, the date and time when the job image 702 to be attached as a sticker (a label), and the like by seeing the additional image 603a and the additional image 603b. It should be noted that the half-cutting shape of the job image 702 and the half-cutting shape of the additional information 703a and the additional information 703b are different from each other in the configuration shown in FIG. 7, which does however not limit the present invention, and these half-cutting shapes may have the same shape. Further, in any case, an apparatus that performs half-cutting using a laser light can be used as the half-cutting apparatus.

A first variation of the first embodiment will be described with reference to FIGS. 8 and 9. In the description of the first variation, differences from the above-described embodiment will be mainly described, and description of similar matters will be omitted.

Figure 8:
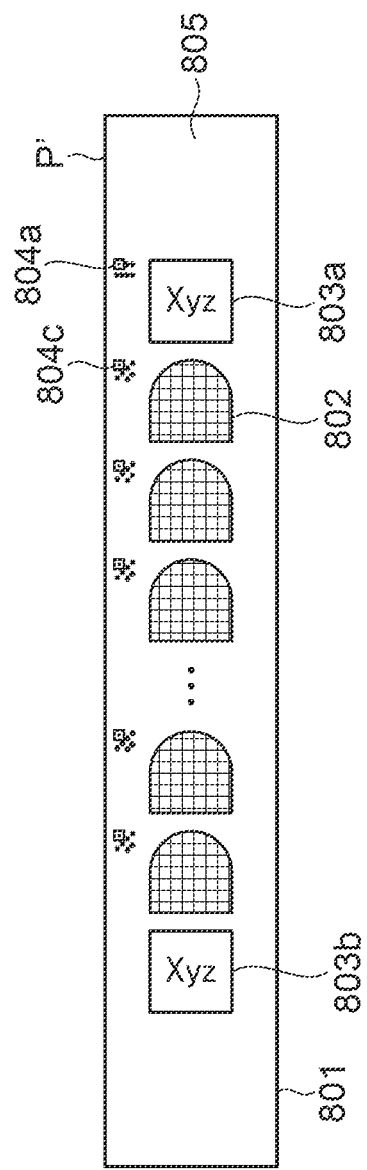
FIG. 8 is a plan view showing a first variation of the product obtained by the image forming system according to the first embodiment.

FIG. 8 is a plan view showing a first variation of the product P' obtained by the image forming system 1 according to the first embodiment. As shown in FIG. 8, on seal paper 801, a plurality of job images 802 each as a plurality of first images, are arranged in a row in the longitudinal direction (the conveyance direction) of the seal paper 801. Further, on the seal paper 801, an additional image 803a is arranged in front of the plurality of job images 802 in the conveyance direction, and an additional image 803b is arranged behind the job images 802 in the conveyance direction. The additional image 803a is a second image. The additional image 803b is a third image that indicates additional information related to the first image and is handled differently from the second image. The third image is formed by the image forming part 22. The additional image 803a and the additional image 803b are the same image in the configuration shown in FIG. 8, which does however not limit the present invention, and the additional image 803a and the additional image 803b may be different from each other.

On the seal paper 801, a QR code 804c as a first half-cutting image is arranged adjacently to each job image 802. Further, on the seal paper 801, a QR code 804a as a second half-cutting image is arranged adjacently to the additional image 803a. The QR code 804a and the QR codes 804c are arranged on a surplus portion (a margin portion) 805 of the seal paper 801. In addition, the additional image 803b is also arranged on the surplus portion 805. As a result, the additional image 803b is removed together with the QR code 804a and the QR codes 804c at the time of the removal operation.

Figure 9:
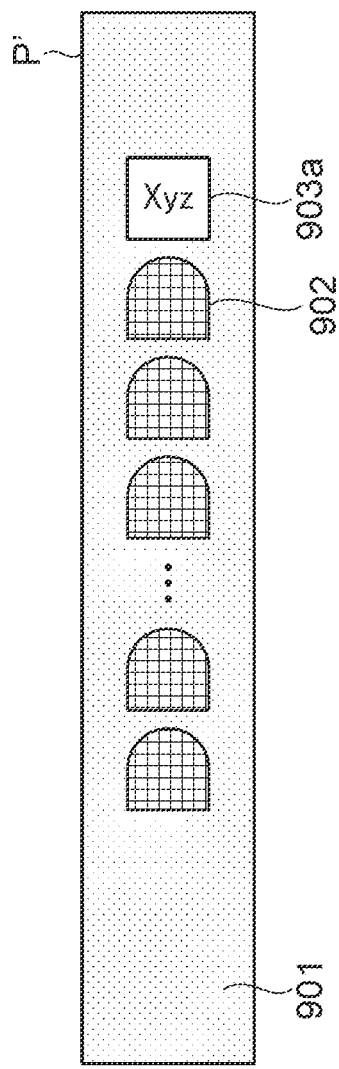
FIG. 9 is a plan view showing a state after the product shown in FIG. 8 is processed by the half-cutting apparatus.

FIG. 9 is a plan view showing a state after the product P' shown in FIG. 8 is processed by the half-cutting apparatus. The product P' shown in FIG. 9 is obtained by the product P' in FIG. 8 being subjected to a removal operation after the half-cutting. It should be noted that the half-cutting by the half-cutting apparatus is performed based on the QR code 804a and the QR codes 804c. On release paper 901 of the product P' obtained by being subjected to the removal operation, job images 902 which are small pieces of the job images 802 formed by the removal operation and additional information 903a which is a small piece of the additional image 803a formed by the removal operation, remain. It should be noted that the additional image 803b formed in the surplus portion 805 is removed by the removal operation. Such a first variation is effective in the case where "the additional image 803b is useful for a worker who handles the product P' in the state shown in FIG. 8, whereas the additional image 803b is unnecessary or confusing for a worker who handles the product P' in the state shown in FIG. 9".

A second variation of the first embodiment will be described with reference to FIGS. 10 and 11. In the description of the second variation, differences from the above-described embodiment and the first variation will be mainly described, and description of similar matters will be omitted.

Figure 10:
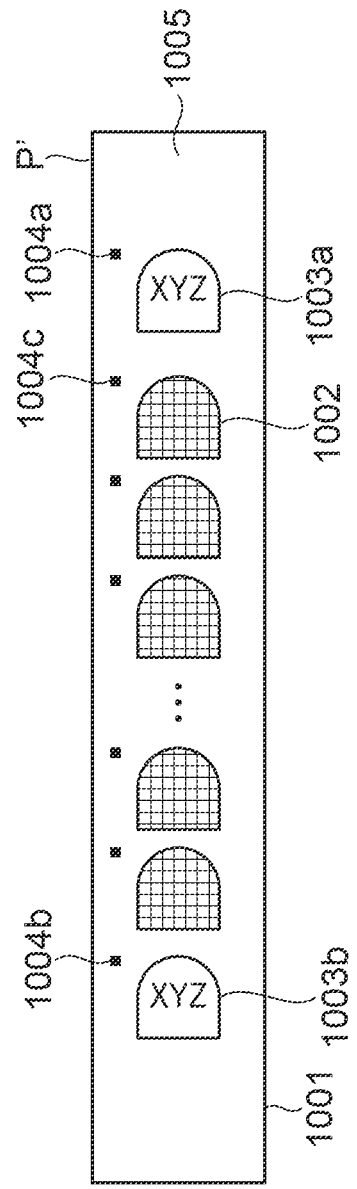
FIG. 10 is a plan view showing a second variation of the product obtained by the image forming system according to the first embodiment.

FIG. 10 is a plan view showing a second variation of the product P' obtained by the image forming system 1 according to the first embodiment. As shown in FIG. 10, on seal paper 1001, a plurality of job images 1002 as a plurality of first images are arranged in a row in the longitudinal direction (the conveyance direction) of the seal paper 1001. Further, in the seal paper 1001, an additional image 1003a as a second image is arranged in front of the plurality of job images 1002 in the conveyance direction, and an additional image 1003b as a second image is arranged behind the plurality of job images 1002 in the conveyance direction.

Further, on the seal paper 1001, a cutting mark 1004c as a first half-cutting image is arranged adjacently to each job image 1002. Further, on the seal paper 1001, a cutting mark 1004a as a second half-cutting image is arranged adjacently to the additional image 1003a, and a cutting mark 1004b as a second half-cutting image is arranged adjacently to the additional image 1003b. The cutting marks 1004a to 1004c are arranged on a surplus portion (a margin portion) 1005 of the seal paper 1001. The cutting marks 1004a to 1004c have the same shape (for example, a quadrangle).

Figure 11:
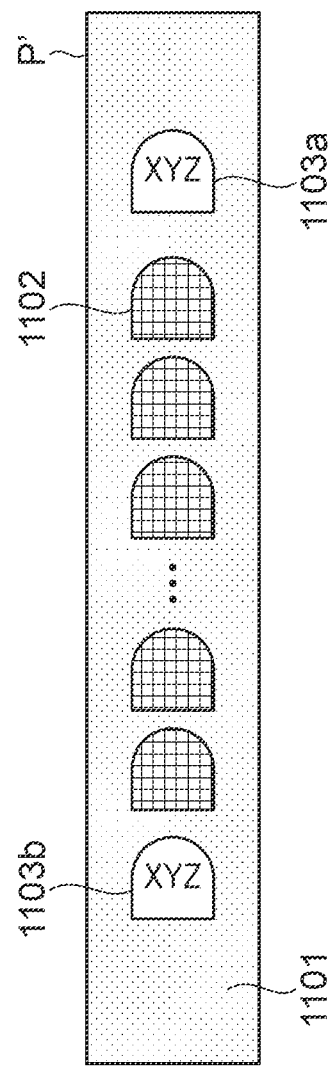
FIG. 11 is a plan view showing a state after the product shown in FIG. 10 is processed by the half-cutting apparatus.

FIG. 11 is a plan view showing a state after the product P' shown in FIG. is processed by the half-cutting apparatus. The product P' shown in FIG. 11 is obtained by the product P' in FIG. 10 being subjected to a removal operation after the half-cutting. It should be noted that the half-cutting by the half-cutting apparatus is performed based on any of the cutting marks 1004a to 1004c. On the release paper 1101 of the product P' obtained by being subjected to the removal operation, job images 1102 which are small pieces of the job images 1002 formed by the removal operation, additional information 1103a which is a small piece of the additional image 1003a formed by the removal operation, and additional information 1103b which is a small piece of the additional image 1003b formed by the removal operation, remain. It should be noted that, the cutting marks 1004a to 1004c have the same shape, and the half-cutting shape of the job image 1102 is therefore the same as the half-cutting shape of the additional information 1103a and the additional information 1103b. In this case, as the half-cutting apparatus, an apparatus that performs half-cutting by die cutting can be used.

A third variation of the first embodiment will be described with reference to FIG. 12. In the description of the third variation, differences from the above-described embodiment and the first and second variations will be mainly described, and description of similar matters will be omitted.

Figure 12:
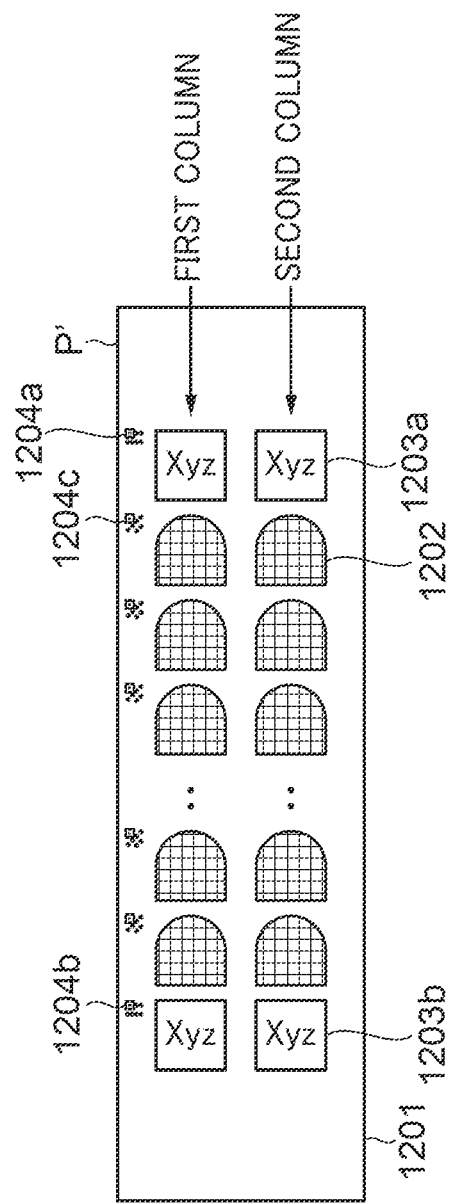
FIG. 12 is a plan view showing a third variation of the product obtained by the image forming system according to the first embodiment.

FIG. 12 is a plan view showing a third variation of the product P' obtained by the image forming system 1 according to the first embodiment. As shown in FIG. 12, a plurality of job images 1202 as a plurality of first images are formed on seal paper 1201 of the product P' in the longitudinal direction (the conveyance direction) of the seal paper 1201, and the plurality of job images 1202 are arranged in two columns in the width direction of the seal paper 1201. This arrangement in two columns is achieved by setting the number of columns to "2" in the display item 411 on the additional information setting screen 400 shown in FIG. 4. Hereinafter, the upper column in FIG. 12 will be referred to as a "first column", and the lower column will be referred to as a "second column".

In each of the first column and the second column, an additional image 1203a as a second image is arranged in front of the plurality of job images 1202 in the conveyance direction, and an additional image 1203b as a second image is arranged behind the plurality of job images 1202 in the conveyance direction. Further, on the seal paper 1201, a QR code 1204c as a first half-cutting image is arranged adjacently to each job image 1202 in the first column. Further, on the seal paper 1201, a QR code 1204a as a second half-cutting image is arranged adjacently to the additional image 1203a in the first column, and a QR code 1204b as a second half-cutting image is arranged adjacently to the additional image 1203b in the first column. It should be noted that the QR codes 1204a to 1204c may be arranged also in the second column similarly to the first column.

As described above, in the third variation, the first image and the second image are treated as one set, and the set is arranged in a plurality of columns in the product P'. That is, the product P' of the third variation has a plurality of sets. Then, the product P' is cut between the first column and the second column (between adjacent sets), after the removal operation. Even after cutting, each column includes not only the job images 1202 as first images but also the additional image 1203a and the additional image 1203b each as a second image. As a result, it is possible for a user to perform the above-described management by confirming the additional image 1203a and the additional image 1203b.

A second embodiment will be described with reference to FIGS. 13 and 14. In the description of the second embodiment, differences from the first embodiment described above will be mainly described, and description of similar matters will be omitted. In a case where additional information is character information, there is a possibility that it may be difficult to include all the character information in one second image depending on, for example, various conditions such as the size of the roll paper P, the size of the second image that can be formed on the roll paper P, the number of characters and/or the size of characters. In the present embodiment, a configuration and an operation of reducing such a difficulty will be described. That is, a description will be given of a configuration in which one piece of additional information is divided into a plurality of cutting areas and the plurality of cutting areas are arranged as a plurality of second images on the page 1 of the product P'.

Figure 13:
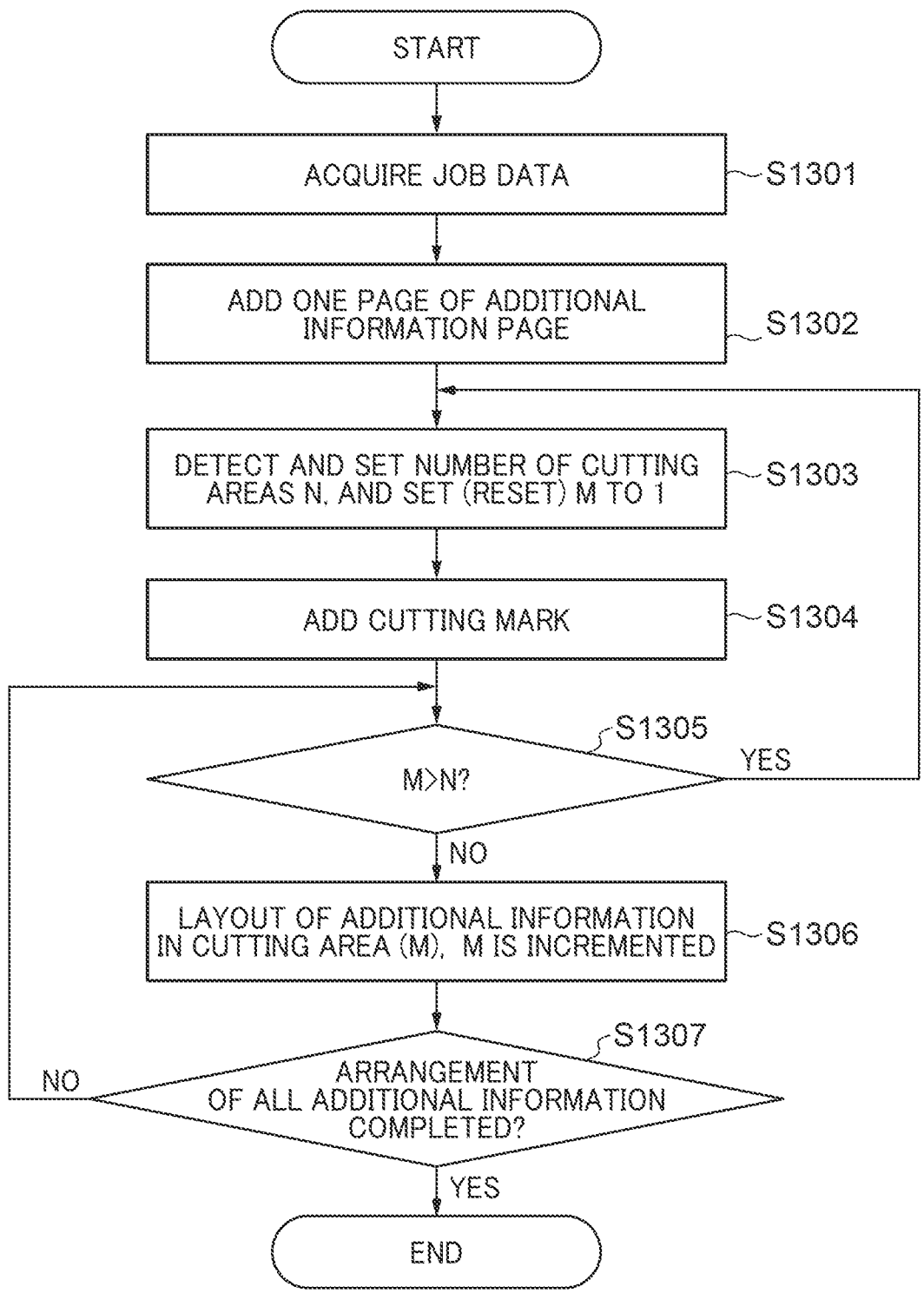
FIG. 13 is a flowchart showing an example of image forming processing according to a second embodiment.

FIG. 13 is a flowchart showing an example of image forming processing according to the second embodiment. The image forming processing is executed by the control part 24 when printing is performed on the roll paper P. Here, it is assumed that there is additional information. Here, it is assumed that a predetermined font size "X" is set for example. FIG. 14 is a plan view showing an example of the product P' obtained by the image forming processing according to the second embodiment. Here, as an example, it is assumed that the product P' (FIG. 14) including a character string "RSTUVWXYZ" as one piece of additional information is obtained by the image forming processing according to the second embodiment.

First, in step S1301, the control part 24 acquires job data selected on the display item 301 of the job list 300.

In step S1302, the control part 24 adds a job ticket of a job selected in the display item 301, and one page of the additional information page set by a user on the display item 403 of the additional information setting screen 400.

In step S1303, the control part 24 detects and sets the number (variable) of cutting areas N in the job image page, and sets a variable M to M=1 (start of "first loop" based on the processing in S1305 (described later)). It should be noted that the variable M is "reset" to 1 for convenience in second and subsequent steps S1303 to which the process returns from step S1305 to be described later (second and subsequent loops based on the processing in S1305 (described later)). Here, the number of cutting areas N is the number of label images (the number of columns) in one page. The variable M represents that "attention is being paid to a cutting area (M), which is a "M-th" cutting area, among the plurality of cutting areas obtained by dividing one piece of additional information". That is, "M=n" is satisfied when attention is being paid to the n-th cutting area among the plurality of cutting areas during the processing. In the product P' shown in FIG. 14, job images 1402 as first images are arranged on seal paper 1401. Here, the number of label images (the number of columns) in one page is two, that is, "the number of cutting areas N=2".

In step S1304, the control part 24 adds a cutting mark 1404 as a second half-cutting image adjacently to an additional information page as a second image.

In step S1305, the control part 24 determines whether or not "M>N" is satisfied. In a case where it is determined in step S1305 that "M>N" is satisfied, the processing returns to step S1303 (second and subsequent loops), and processes of step S1303 and the subsequent steps are sequentially executed. On the other hand, in a case where it is determined in step S1305 that "M>N" is not satisfied, the processing proceeds to step S1306. Here (in the first loop), attention is being paid to the first cutting area (M=1), and N is N=2, and it is therefore determined that "M>N" is not satisfied, and the processing proceeds to step S1306.

In step S1306, the control part 24 performs a layout of characters in the cutting area (M), which is the M-th cutting area in one page of the additional information page, by an amount of characters that are allowed to be included in the cutting area (M) with a predetermined font size X, and increments the variable M. In a case where the processing up to S1305 is performed while attention is paid to a cutting area (1), the variable M is incremented in step S1306, and M=2 is obtained. That is, a cutting area (2) is a cutting area to which attention is paid from now on. It should be noted that, in the product P' shown in FIG. 14, a cutting area 1403a is the first cutting area (1) (M=1) of the first page.

In step S1307, the control part 24 determines whether or not the arrangement of all the additional information is completed. In a case where it is determined in step S1307 that the arrangement of all the additional information is completed, the processing ends. In a case where it is determined in step S1307 that the arrangement of all the additional information is not completed, the processing returns to step S1305, and processes in step S1305 and the subsequent steps are sequentially executed.

Figure 14:
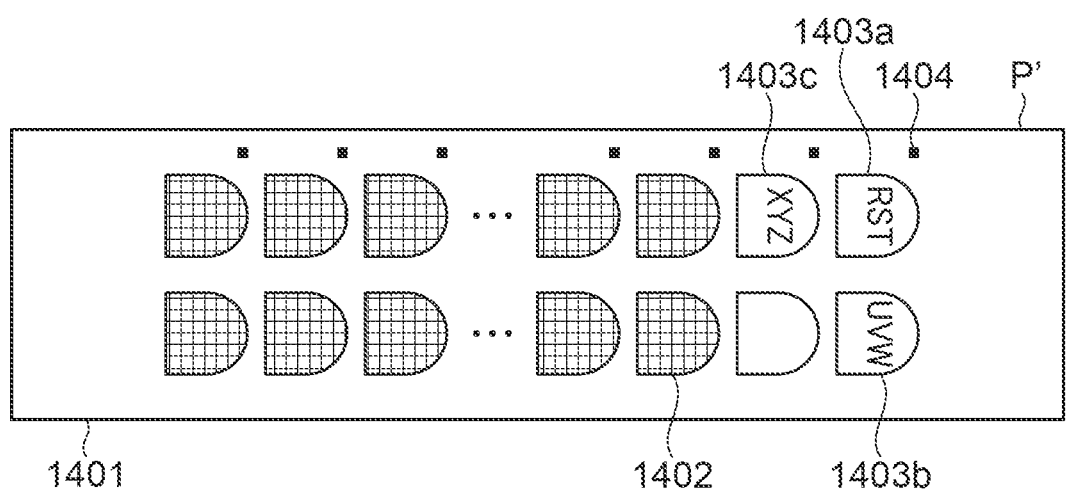
FIG. 14 is a plan view showing an example of a product obtained by the image forming processing according to the second embodiment.

Here, it is assumed that all the additional information cannot be arranged yet (refer to FIG. 14). In step S1307, it is determined that the arrangement of all the additional information is not completed, the processing returns to step S1305, and again, it is determined in step S1305 whether or not "M>N" is satisfied. Then, according to M=2 and N=2, it is determined in step S1305 that "M>N" is not satisfied, and the processing proceeds to step S1306. Then, in S1306, the variable M is incremented to M=3. That is, a cutting area (3) is a cutting area to which attention is paid from now on. It should be noted that, in the product P' shown in FIG. 14, a cutting area 1403b is the second (M=2) cutting area (2) of the first page. Thereafter, it is determined that, even if the additional information is laid out in two (N=2) cutting areas in one page, not all the additional information has been arranged yet (NO in S1307), and the processing returns to step S1305 again. Here, according to M=3 and N=2, it is determined in step S1305 that "M>N" is satisfied, and the processing returns to step S1303 (the end of the "first loop" based on the processing in S1305). Next, in S1303 (in the second loop), M is reset to 1 (M=1). Thereafter, the processing in step S1304 is executed again, and then, in step S1305, it is determined that "M>N" is not satisfied based on M=1 and N=2, and the processing proceeds to step S1306. Then, the additional information is laid out in the cutting area (3), that is, in the cutting area (1) of the second loop, and the variable M is incremented to be M=2 of the second loop. It should be noted that, in the product P' shown in FIG. 14, a cutting area 1403c is the cutting area (3) (the cutting area (1) in the second loop). Then, the processing proceeds to step S1307, and it is determined that the arrangement of all the additional information is completed (that is, there is no cutting area (4) (M=2 is not satisfied in the second loop)), and the present processing ends.

As described above, one piece of additional information is divided into the plurality of (three in the present embodiment) cutting areas and arranged as the plurality of second images (the cutting areas 1403a to 1403c), whereby all the contents of the additional information can be arranged in the product P' with the predetermined font size X. In this way, in the present embodiment, the plurality of second images can be arranged, which makes it possible that, in a case where all the additional information cannot be included in one second image due to various conditions, one piece of additional information can be distributed, allocated and displayed (formed) on the plurality of second images. As a result, a user can confirm the additional information without excess or deficiency.

Although the preferred embodiments of the present invention have been described above, the present invention is not limited to the above-described embodiments. For example, although roll paper is used as image forming paper in each of the embodiments, the image forming paper is not limited thereto, and for example, image forming paper having various sizes such as an A size and a B size can also be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-169288, filed Oct. 21, 2022, which is hereby incorporated by reference wherein in its entirety.

What is claimed is:
1. An image forming apparatus that is configured to form an image related to half-cutting processing, in which a periphery of the image on seal paper of image forming paper is cut without cutting release paper, the image forming paper including the seal paper having an adhesive surface and the release paper capable of being peeled off from the adhesive surface,
    the image forming apparatus comprising:
        an image forming part configured to form a first image and a second image indicating additional information related to the first image, on the seal paper of the image forming paper;
        one or more controllers configured to function as:
        a setting unit configured to make setting related to the additional information;
        an acquisition unit configured to acquire first half-cutting information related to first half-cutting for leaving a portion of the first image in the seal paper on the release paper after the half-cutting processing is performed, and to acquire, second half-cutting information related to second half-cutting for leaving, based on the setting made, a portion of the second image in the seal paper on the release paper after the half-cutting processing is performed; and a control unit configured to control the image forming part to form, on the seal paper, the first image and the second image based on the setting.

2. The image forming apparatus according to claim 1, wherein the one or more controllers further function as
a generation unit configured to generate, based on the setting, the second half-cutting information,
wherein the acquisition unit acquires the second half-cutting information from the generation unit.

3. The image forming apparatus according to claim 1, wherein
the control unit controls the image forming part to form, on the seal paper, a first half-cutting image indicating the first half-cutting information and a second half-cutting image indicating the second half-cutting information.

4. The image forming apparatus according to claim 3, wherein
the first half-cutting image and the second half-cutting image are read by a half-cutting apparatus that performs the first half-cutting and the second half-cutting.

5. The image forming apparatus according to claim 3, wherein
the setting unit is further configured to select, as the setting, execution of the second half-cutting or non-execution of the second half-cutting, and
in a case where the non-execution of the second half-cutting is selected, the control unit omits formation of the second half-cutting image.

6. The image forming apparatus according to claim 1, wherein the one or more controllers further function as
a transmission unit configured to transmit the first half-cutting information and the second half-cutting information, to a half-cutting apparatus that performs the first half-cutting and the second half-cutting.

7. The image forming apparatus according to claim 1, wherein
the image forming part is further configured to form a third image indicating the additional information related to the first image and being handled differently from the second image, and
the control unit forms the third image on a surplus portion of the seal paper, which is peelable from the release paper when the first half-cutting and the second half-cutting are performed.

8. The image forming apparatus according to claim 1, wherein
the control unit handles, as one set, the first image and the second image, and arranges a plurality of the sets and form the plurality of the sets on the seal paper, and
the image forming paper having the first image and the second image formed thereon is cut between adjacent sets.

9. The image forming apparatus according to claim 1, wherein
the control unit is configured to arrange and form a plurality of the second images on the seal paper, wherein the control unit distributes and allocates one piece of the additional information on the plurality of second images.

10. The image forming apparatus according to claim 1, wherein
roll paper is used as the image forming paper.

11. A control method for an image forming apparatus that is configured to form an image related to half-cutting processing and includes an image forming part configured to form a first image and a second image indicating additional information related to the first image, on seal paper of image forming paper, the image forming paper including the seal paper having an adhesive surface and release paper capable of being peeled off from the adhesive surface, wherein the half-cutting processing cuts a periphery of the image on the seal paper of the image forming paper without cutting the release paper,
the control method comprising:
making setting related to the additional information;
acquiring first half-cutting information related to first half-cutting for leaving a portion of the first image in the seal paper on the release paper after the half-cutting processing is performed, and acquiring second half-cutting information related to second half-cutting for leaving, based on the setting made, a portion of the second image in the seal paper on the release paper after the half-cutting processing is performed; and
controlling the image forming part to form, on the seal paper, the first image and the second image based on the setting.

12. A non-transitory storage medium storing a program for causing a computer to execute a control method for an image forming apparatus that is configured to form an image related to half-cutting processing and includes an image forming part configured to form a first image and a second image indicating additional information related to the first image, on seal paper of image forming paper, the image forming paper including the seal paper having an adhesive surface and release paper capable of being peeled off from the adhesive surface, wherein the half-cutting processing cuts a periphery of the image on the seal paper of the image forming paper without cutting the release paper,
the control method comprising:
making setting related to the additional information;
acquiring first half-cutting information related to first half-cutting for leaving a portion of the first image in the seal paper on the release paper after the half-cutting processing is performed, and acquiring second half-cutting information related to second half-cutting for leaving, based on the setting made, a portion of the second image in the seal paper on the release paper after the half-cutting processing is performed; and
controlling the image forming part to form, on the seal paper, the first image and the second image based on the setting.

* * * * *